H. G. McCOMB.
SHACKLE.
APPLICATION FILED NOV. 1, 1913.

1,169,502.

Patented Jan. 25, 1916.

WITNESSES:

INVENTOR.
Henry G. McComb,
BY
ATTORNEY

UNITED STATES PATENT OFFICE.

HENRY G. McCOMB, OF NEW YORK, N. Y., ASSIGNOR TO GENERAL VEHICLE COMPANY, INCORPORATED, A CORPORATION OF NEW YORK.

SHACKLE.

1,169,502.     Specification of Letters Patent.     Patented Jan. 25, 1916.

Application filed November 1, 1913. Serial No. 798,673.

*To all whom it may concern:*

Be it known that I, HENRY G. McCOMB, a citizen of the United States, residing at New York, county of New York, State of New York, have invented certain new and useful Improvements in Shackles, of which the following is a specification.

My invention relates to shackles, particularly to such as are used with vehicle springs. To attach the end of a leaf spring of vehicles to an adjacent part, it is usual to coil the end of the spring around a bolt carrying the shackle links which directly make the attachment. Generally a tubular bearing is fitted to the coiled end of the spring to furnish the surface bearing on the bolt. There is more or less rotative movement between the shackle bolt and the spring, or its bearing member, as the spring acts under the irregularities of the roadway and the location of the springs is such that they readily accumulate considerable dirt which works in between the bearing surface of the shackles. Considerable difficulty has been encountered through the destruction of these bearing surfaces in this way.

The object of my invention is to provide means for preventing the admission of dirt to the bearing surfaces of the shackles. To this end I employ adjacent each link, a rather thick washer, preferably of a fibrous material, which extends for a part of its width into the adjacent shackle link and for the remainder of its width into the eye of the spring or other device, thus being completely covered by the link and eye. Each creepage path for dirt between the exterior and the bearing of the shackle is increased in length by these washers and is made to include a sharp angle.

Figure 2:
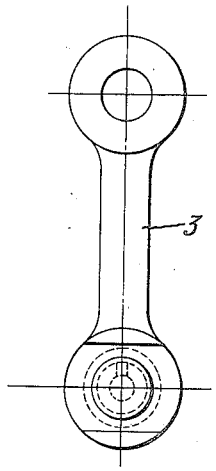
Figure 1:
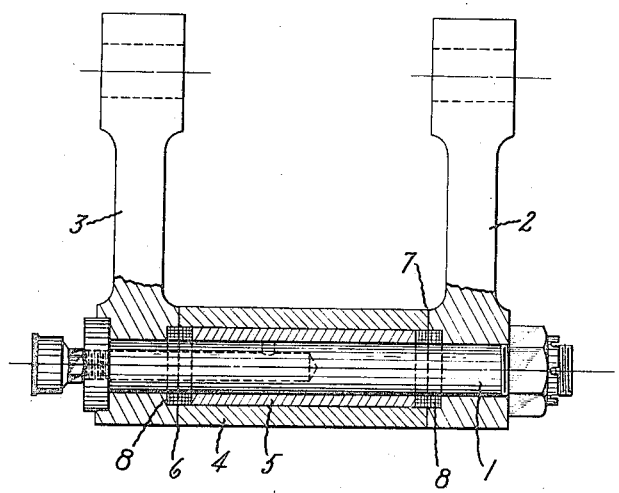

In the accompanying drawings which form a part of this specification: Figure 1 is an elevation partly in section of a shackle and eye to which my invention is applied. Fig. 2 is an end view thereof.

The shackle is similar in its general construction to that already common. The bolt 1 carries at each end the link members 2 and 3; between the link members is located the eye 4 of the spring or other member which, in the case illustrated, carries the bearing sleeve or tube 5 for supplying the bearing surface in contact with the bolt 1. The links and eye are held in position on the bolt by the head of the bolt and a nut. A common means for lubricating the bearing surfaces of the bolt and tube 5 is illustrated.

In this simple and common structure which I have described, dust and dirt tend to creep between the eye and the links at their meeting surfaces at 6 and 7, and find their way to the bearing surfaces of the sleeve 5 and the bolt 1. To prevent this I have added the washers 8. The sleeve 5 is reduced in length at each end substantially half the thickness of the washer 8, and each link is counterbored to a similar depth at the side adjacent the eye. In the space so provided, I have placed the washers 8 which thus extend into both the eye and the links. Preferably, these washers are of some fibrous material, as felt, but any other suitable material may be employed. It will be apparent that by my improved construction the creepage distances between the exterior of the shackle and the bearing surfaces thereof, have been considerably extended and that the angle included in the creepage paths renders the passage of dirt doubly difficult.

What I claim as new and desire to secure by Letters Patent of the United States, is:—

The combination in a shackle, of a pair of parallel links having openings, a bolt extending through the openings, a member having an eye which surrounds the bolt between the links and is adapted to oscillate thereon, the ends of said member being in engagement with the links, a bearing sleeve in the eye which terminates short of the ends of the eye to form annular recesses, the opposed faces of the links being counterbored to also form annular recesses which coöperate with the first named recesses to define a chamber surrounding the bolt at each end of the eye, and a washer in each chamber, said washer being entirely covered by the eye and links thereby preventing the admission of dirt to the bearing surfaces between the sleeve and the bolt.

In witness whereof, I have hereunto set my hand this 29th day of October, 1913.

HENRY G McCOMB.

Witnesses:
EDWARD R. BAINES,
H. E. KLINE.